United States Patent
Sang (10) Patent No.: US 8,959,240 B2
(45) Date of Patent: Feb. 17, 2015

(54) METHOD, APPARATUS AND SYSTEM FOR RAPID ACQUISITION OF MULTICAST REALTIME TRANSPORT PROTCOL SESSIONS

(75) Inventor: Zhuo Sang, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 295 days.

(21) Appl. No.: 13/392,049

(22) PCT Filed: May 12, 2010

(86) PCT No.: PCT/CN2010/072697
§ 371 (c)(1),
(2), (4) Date: May 3, 2012

(87) PCT Pub. No.: WO2011/022994
PCT Pub. Date: Mar. 3, 2011

(65) Prior Publication Data
US 2012/0233346 A1 Sep. 13, 2012

(30) Foreign Application Priority Data

Aug. 24, 2009 (CN) .......................... 2009 1 0091714

(51) Int. Cl.
*G06F 15/16* (2006.01)
*H04L 29/06* (2006.01)
*H04L 12/761* (2013.01)

(52) U.S. Cl.
CPC ............ *H04L 65/4076* (2013.01); *H04L 65/80* (2013.01); *H04L 45/16* (2013.01); *H04L 65/608* (2013.01)
USPC ........................................................ 709/231

(58) Field of Classification Search
CPC .................... H04L 29/06455; H04L 29/06519
USPC ........................................................ 709/231
See application file for complete search history.

(56) References Cited

U.S. PATENT DOCUMENTS

| | | | | | |
|---|---|---|---|---|---|
| 5,928,331 | A | * | 7/1999 | Bushmitch | 709/231 |
| 7,031,326 | B1 | * | 4/2006 | Shur et al. | 370/401 |
| 7,656,908 | B1 | * | 2/2010 | Begeja | 370/507 |
| 2009/0106803 | A1 | * | 4/2009 | Chen et al. | 725/103 |

FOREIGN PATENT DOCUMENTS

CN 1540920 A 10/2004

OTHER PUBLICATIONS

Yang, et el., "Synchronized Playback in Rapid Acquisition of Multicast Sessions, draft-yang-avt-rtp-synced-playback-01.txt," Audio/Video Transport WG, Internet Draft Oct. 2010.

* cited by examiner

*Primary Examiner* — Yves Dalencourt
(74) *Attorney, Agent, or Firm* — Joseph Hyosuk Kim; JHK Law (57) ABSTRACT

Provided are a method, an apparatus, and a system for rapid acquisition of multicast realtime transport protocol sessions. The method comprises the following steps executed by a unicast server: receiving multicast rapid acquisition control request signalling sent by a media client, wherein the control request signaling contains synchronization request information; determining data synchronization of the media client according to the synchronization request information in the control request signaling; determining synchronization response information according to the time difference between play time of a stored random access point and the current time, wherein the synchronization response information contains play speed information and play duration of unicast media stream; generating multicast rapid acquisition control response signaling, wherein the control response signaling contains synchronization response information and multicast acquisition information; unicasting the control response signaling and stored media stream to the media client. With the invention, the media client that lags more can play lagged media stream with a faster play speed and thus synchronization of video play picture between different media clients can be achieved.

20 Claims, 5 Drawing Sheets

METHOD, APPARATUS AND SYSTEM FOR RAPID ACQUISITION OF MULTICAST REALTIME TRANSPORT PROTCOL SESSIONS

CROSS REFERENCE TO RELATED APPLICATIONS

This application is a National Phase application, filed under 35 U.S.C. §371, of PCT Application No. PCT/CN2010/072697, filed May 12, 2010, which claims the benefit of priority to Chinese Patent Application No. 200910091714.7, filed on Aug. 24, 2009, the contents of which are incorporated herein by reference in their entirety.

FIELD OF THE INVENTION

The present invention relates to the field of streaming media communication, and in particular, to a method, an apparatus and a system for rapid acquisition of multicast realtime transport protocol sessions (RAMS).

BACKGROUND OF THE INVENTION

The media client must play videos by beginning with a random access point. Therefore in the traditional multicast video service, in order to be adapted for playing videos when different media clients joined in the multicast group at different time, the multicast server generally sends random access point in a fixed period. And the media client obtains the random access point through the multicast address. In order to make the client newly joined in the multicast group play pictures rapidly, the period is generally very short. The random access point of the video adopts the intra-frame coding; and the coding time and frame size after the coding are far greater than the normal frame which adopts the inter-frame coding. Consequentially, the time interval between the video streaming random access points is in inverse proportion to the coding, decoding and transmission efficiencies.

The technical solution of the Rapid Acquisition of Multicast Realtime Transport Protocol Sessions (RAMS) of Internet Engineering Task Force (IETF) provides a method of rapid acquisition of media client in a Realtime Transport Protocol (RTP) multicast session. Compared with the traditional multicast video service method, the method using the RAMS may reduce the delay time of the media client before joining in the RTP multicast session. In the streaming media multicast service of the multicast group which needs to be switched frequently by the media client, such as an Internet Protocol Television (IPTV), the media client adopting the RAMS solution can switch channels rapidly. Thereby the waiting time for the play of the videos is reduced, and the user experience is improved.

Figure 1:
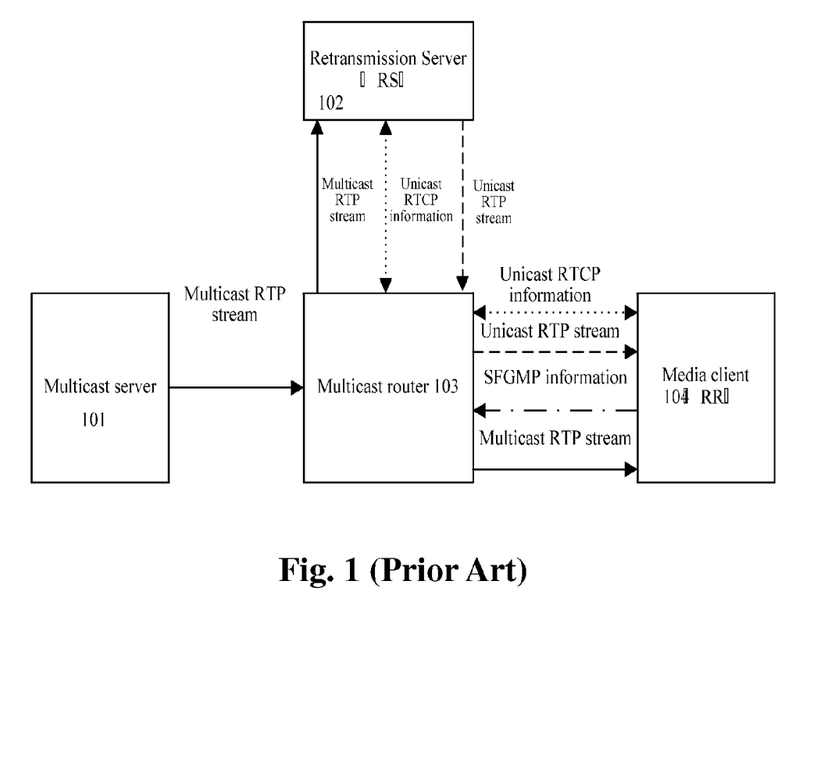
FIG. 1 shows a structured flowchart of a RAMS system in related art.

FIG. 1 is a structured flowchart of RAMS system which provides RAMS service in related art. As shown in FIG. 1, the streaming media multicast system comprises: a multicast server 101, a Retransmission Server (RS) 102, a multicast router 103 and a media client 104. The media client is a RTP Receiver (RR). In the RAMS solution, the RS stores all the data sent by the multicast server, performs control signalling communication with the media client, and sends the stored multicast media stream data to the media client by using the unicast and rapid-send mode. The multicast server is for transmitting the media stream to the multicast address in a multicast way. The multicast router is for receiving the media stream of the multicast server, transmitting the media stream to the RS and the media client in a multicast way, forwarding the unicast media stream and the control signalling between the RS and the media client, and processing Source Filtering Group Management Protocol (SFGMP) information. The media client is for receiving and playing the multicast media stream and the media stream data sent from the unicast server in the unicast and rapid-send mode, performing control signalling communication with the unicast server, and sending the SFGMP information to the multicast router. The RS rapidly sends Reference Information (RI) to the RR through the unicast way according to the request of the RR at the media client. The RR analyzes the random access point of the streaming media videos from the received RI and plays it to a user. In the RAMS solution, as the random access point of the RR which joins in the multicast group for the first time is obtained from the RI rapidly sent from the RS rather than obtained from the multicast address, the delay time for playing the pictures for the first time by the media client is no longer affected by the length of the transmission period of the video stream random access point. Therefore, as the RAMS adopts the way of increasing the time interval between the random access points, the coding, decoding and transmission efficiencies are improved.

However, in accordance with the RAMS method, the random access point rapidly sent from the RS to the RR is generally the latest random access point closest to the RR request time. Therefore, different clients after joining in the same multicast group at different time may receive different video random access points sent from the RS. As a result, the videos played by different clients at the same moment are different. Furthermore, the play delay between clients increases along with the gradually increased time interval between the adjacent random access points of the RAMS. In the stream media multicast application, such as the IPTV, video conferences, remote education and the like, excessive delay between the media clients results in a reduction of the user experience, even wrong transfer of information to affect the normal service use of users.

SUMMARY OF THE INVENTION

The purpose of the present invention is to provide a method for Rapid Acquisition of Multicast Realtime Transport Protocol Sessions (RAMS), a unicast server, a media client and a system to solve the problem of asynchronous play of the videos between different media clients in the method for rapid acquisition of streaming media multicast in the related art.

In order to realize the purpose, the present invention provides a method for rapid acquisition of multicast RTP sessions, the method comprising the following steps:

receiving, by a unicast server, a multicast rapid acquisition control request signalling transmitted by a media client, wherein the control request signalling comprises synchronization request information;

determining, by the unicast server, that the media client performs data synchronization according to synchronization request information in the control request signalling;

determining, by the unicast server, synchronization response information for the media client to perform the data synchronization according to the time difference between stored play time of a random access point and a current time, wherein the synchronization response information comprises: the play speed information of a unicast media stream and play duration of the unicast media stream;

generating a multicast rapid acquisition control response signalling by the unicast server, wherein the control response signalling comprises: the synchronization response information and multicast acquisition information; and transmitting, by the unicast server, the control response signalling and the stored media stream to the media client in a unicast way so that the media client sets the play speed and the play duration for playing the unicast media stream; and the stored media stream comprises random access point transmitted in a multicast way by the multicast server.

Preferably, the method further comprises: the synchronization request information comprises: a data synchronization flag; and the step of determining by the unicast server that the media client performs the data synchronization according to the synchronization request information in the control request signalling comprises: determining, by the unicast server, that the media client performs the data synchronization according to the value of the data synchronization flag.

Preferably, the play speed of the unicast media stream is multiple of the preset normal play speed; and the multiple is greater than or equal to 1.

Preferably, after generating the multicast rapid acquisition control response signalling by the unicast server, the method further comprises: the media client receiving the control response signalling, joining in a multicast group according to the multicast acquisition information in the control response signalling, receiving the media stream of the multicast group, and setting the play speed of the unicast media stream and the play duration of the unicast media stream according to the synchronization response information; and the media client playing the received unicast media stream according to the play speed of the unicast media stream and the play duration of the unicast media stream.

Preferably, after the media client playing the received unicast media stream according to the play speed of the unicast media stream and the play duration of the unicast media stream, the method further comprises:

when the duration of playing the unicast media stream by the media client is the play duration of the unicast media stream, playing the multicast media stream at a normal speed by the media client.

Preferably, determining by the unicast server the synchronization response information for the media client to perform the data synchronization according to the time difference between the stored play time of the random access point and the current time comprises: determining by the unicast server the synchronization response information for the media client to perform the data synchronization according to the time difference between the stored play time of the latest random access point and the current time.

Preferably, the unicast server determines the play speed of the unicast media stream according to a preset first corresponding relation; and the first corresponding relation is: the corresponding relation between the time difference, wherein the time difference is between the stored media play time of the latest random access point and the current time, and the play speed of the unicast media stream.

Preferably, the play duration L of the unicast media stream is determined by the following formula:

$$L = \begin{cases} T/(S-1), & S > 1 \\ 0, & S = 1 \end{cases}$$

where S represents the multiple of the play speed of the unicast media stream relative to the normal play speed; the multiple is greater than or equal to 1; and T represents the time difference between the stored media play time of the latest random access point and the current time.

In accordance with another aspect of the present invention, a unicast server is provided.

According to the present invention, the unicast server comprises:

a control request receiving module, adapted for receiving a multicast rapid acquisition control request signalling transmitted by a media client, wherein the control request signalling comprises synchronization request information;

a synchronization determination module, adapted for determining that the media client performs the data synchronization according to the synchronization request information in the control request signalling;

a server side synchronization module, adapted for determining the synchronization response information for the media client to perform the data synchronization according to the time difference between a stored media play time of a random access point and a current time, wherein the synchronization response information comprises: play speed information of a unicast media stream and play duration of the unicast media stream;

a signalling generation module, adapted for generating a multicast rapid acquisition control response signalling, wherein the control response signalling comprises: the synchronization response information and multicast acquisition information; and a transmission module, adapted for transmitting the control response signalling and the stored media stream to the media client in a unicast way so that the media client sets the play speed and the play duration for playing the unicast media stream; and the stored media stream comprises a random access point transmitted in a multicast way by a multicast server.

Preferably, the play speed of the unicast media stream is a multiple of the preset normal play speed; and the multiple is greater than or equal to 1.

Preferably, the server side synchronization module comprises:

a play speed determination module, adapted for determining the play speed of the unicast media stream according to a preset first corresponding relation; and the first corresponding relation is: the corresponding relation between the time difference, wherein the time difference between the stored media play time of the latest random access point and the current time, and the play speed of the unicast media stream; and a play duration determination module, adapted for determining the play duration L of the unicast media stream by the following formula:

$$L = \begin{cases} T/(S-1), & S > 1 \\ 0, & S = 1 \end{cases}$$

where S represents the multiple of the play speed of the unicast media stream relative to the normal play speed; the multiple is greater than or equal to 1; and T represents the time difference between the stored media play time of the latest random access point and the current time.

In accordance with another aspect of the present invention, a media client is provided.

According to the present invention, the media client comprises:

a control request generation module, adapted for generating a multicast rapid acquisition control request signalling, wherein the control request signalling comprises synchronization request information;

a receiving module, adapted for receiving a unicast media stream and a multicast rapid acquisition control response signalling transmitted by a unicast server in the unicast way, wherein the control response signalling comprises: multicast acquisition information and synchronization response information for the media client to perform the data synchronization; the synchronization response information comprises: play speed of the unicast media stream and play duration of the unicast media stream; and the unicast media stream comprises a random access point stored by the unicast server;

a client synchronization module, adapted for setting the play speed of the unicast media stream and the play duration of the unicast media stream according to the synchronization response information in the control response signalling received by the receiving module; and a playing module adapted for playing the received unicast media stream according to the play speed of the unicast media stream and the play duration of the unicast media stream.

In accordance with another aspect of the present invention, a system for Rapid Acquisition of Multicast Realtime Transport Protocol Sessions (RAMS) of a streaming media is provided, the system comprising: a multicast server, a multicast router, a unicast server and a media client, wherein the unicast server comprises:

a control request receiving module, adapted for receiving a multicast rapid acquisition control request signalling transmitted by the media client, wherein the control request signalling comprises synchronization request information;

a synchronization determination module, adapted for determining that the media client performs the data synchronization according to the synchronization request information in the control request signalling;

a server side synchronization module, adapted for determining synchronization response information for the media client to perform the data synchronization according to the time difference between stored media play time of a random access point and a current time, wherein the synchronization response information comprises: play speed information of a unicast media stream and play duration of the unicast media stream;

a signalling generation module, adapted for generating a multicast rapid acquisition control response signalling, wherein the control response signalling comprises: the synchronization response information and multicast acquisition information; and a transmission module, adapted for transmitting the control response signalling and the stored media stream to the media client in a unicast way so that the media client sets the play speed and the play duration for playing the unicast media stream; and the stored media stream comprises a random access point transmitted in a multicast way by a multicast server; and the media client comprises:

a control request generation module, adapted for generating the multicast rapid acquisition control request signalling, wherein the control request signalling comprises the synchronization request information;

a receiving module, adapted for receiving the unicast media stream and the multicast rapid acquisition control response signalling transmitted by the unicast server in the unicast way and;

a client synchronization module, adapted for setting the play speed of the unicast media stream and the play duration of the unicast media stream according to the synchronization response information in the control response signalling; and a playing module adapted for playing the received unicast media stream according to the play speed of the unicast media stream and the play duration of the unicast media stream.

Through the present invention, when starting the RAMS service of rapid acquisition in the multicast RTP sessions, the media client sends the multicast rapid acquisition control request signalling containing the synchronization request information to the unicast server; and the unicast server generates the synchronization response information according to the time difference between the current time and the play time of the random access point and transmits, in a unicast way, the synchronization response information as a portion of the control response signalling to the media client. Therefore, the media client can play the unicast media stream containing the random access point according to the play speed information and the play duration of the unicast media stream in the synchronization response information. As a result, the media client with relatively large lag can play lagged media stream with a faster play speed, synchronization of video play picture between different media clients can be achieved, and the media client can avoid from showing wrong videos and the user experience can be improved.

DETAILED DESCRIPTION OF THE EMBODIMENTS

In order to make the purpose, the technical solution and advantages of the present invention more clear, the present invention is further described below with reference to the drawings and specific embodiments in detail.

The method for rapid acquisition of multicast RTP Sessions (RAMS) of streaming media in the embodiment of the present invention comprises: after the media client starts the multicast rapid acquisition service of the streaming media, the media client generates the synchronization request information, and the unicast server generates synchronization response information for the data synchronization of the media clients; and the synchronization information is transferred through the interactive control signalling between the media client and the unicast server; and the media client plays the unicast media stream containing the random access point according to the play speed information and the play duration information of the unicast media stream in the synchronization response information so as to realize the data synchronization of the media stream between different media clients in the RAMS.

Figure 2:
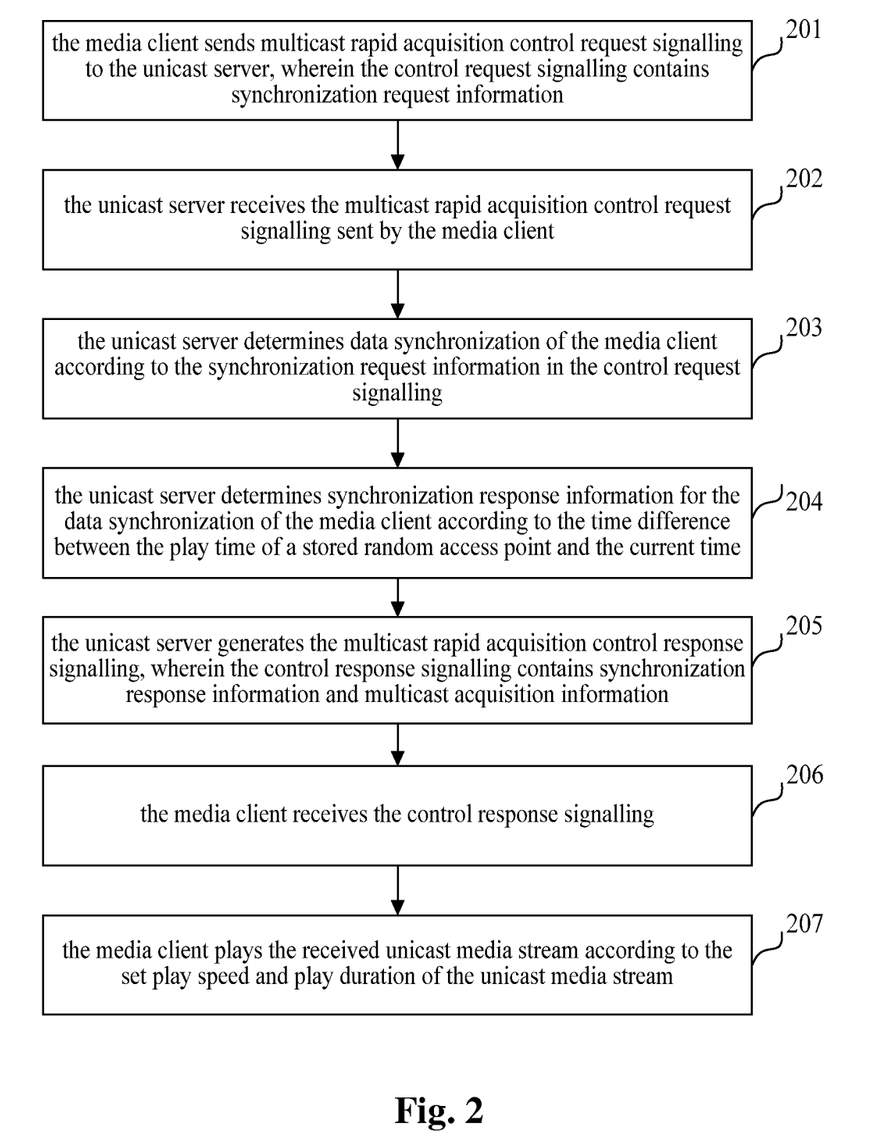
FIG. 2 shows a flowchart of a RAMS method according to an embodiment of the present invention.

FIG. 2 shows a RAMS method of rapid acquisition of multicast RTP Sessions of the streaming media according to an embodiment of the present invention, that is, a flowchart of a RAMS method. As shown in the FIG. 2, the RAMS method of the embodiment comprises the following steps.

Step 201, after the media client starts the multicast rapid acquisition service of the streaming media, the media client generates and sends the multicast rapid acquisition control request signalling to the unicast server, wherein the control request signalling contains synchronization request information.

Preferably, the synchronization request information contains the data synchronization flag for indicating whether the media client needs the data synchronization; and the flag of different values can indicate whether the data synchronization is needed.

Step 202, the unicast server receives the multicast rapid acquisition control request signalling sent by the media client.

Step 203, the unicast server determines data synchronization of the media client according to the synchronization request information in the control request signalling.

As a demonstration, the unicast server determines whether the media client needs the data synchronization according to the value of the data synchronization flag in the synchronization request information.

Step 204, the unicast server determines synchronization response information needed by the data synchronization of the media client according to the time difference between the play time of a stored random access point and the current time, wherein the synchronization response information contains play speed information and play duration of unicast media stream.

In this step, preferably, the unicast server determines the synchronization response information needed by the data synchronization of the media client according to the time difference between the media play time of the stored latest random access point and the current time, wherein the latest random access point is the random access point stored in the unicast server and having minimum time difference with the current time.

As a demonstration, when the value of the time difference is relatively great, the value of the play speed can be set slightly greater; otherwise, the value of the play speed is set slightly smaller.

Preferably, the play speed is greater than the normal play speed preset by the media client.

Preferably, the play speed information can be the multiple of the preset normal play speed or the play speed value.

Step 205, the unicast server generates multicast rapid acquisition control response signalling, wherein the control response signalling contains synchronization response information and multicast acquisition information, and transmits the control response signalling and stored media stream to the media client in a unicast way.

Step 206, the media client receives the control response signalling, joins in the multicast group according to the RI in the control response signalling, receives the multicast media stream, and sets the play speed and the play duration of the unicast media stream according to the synchronization response information in the control response signalling.

Step 207, the media client plays the received unicast media stream according to the set play speed and play duration of the unicast media stream.

In this step, it is that the media client plays according to the play speed information and the play duration information in the synchronization response signalling; and it plays till the play duration, then it ends the multicast rapid acquisition service and starts playing the multicast media stream.

In the method of the embodiment of the present invention, the unicast server determines the play speed information and the play duration of the unicast media stream needed for realizing the data synchronization of the media client according to the time difference between the media play time of the stored random access point and the current time, and sends the play speed information and the play duration information as the synchronization response information to the requesting media client so that the media client can sets the play speed and the play duration of the unicast media stream thereof. Therefore, when different media clients request for RAMS for the unicast server at different time, the random access point included in the received unicast media stream, such as the video random access point, can be played at different play speeds and different play durations according to the length of the time difference between the current time and the play time of the random access point, so as to make the media client with relatively large lag be able to catch up the multicast media stream currently played by the multicast server with faster play speed and realize the data synchronization between different media clients.

The problem of asynchronous video play of clients in the RAMS method in the related art is as follows: the videos played by different clients at the same moment may be different as different clients after joining in the same multicast group at different time may receive different video random access points sent by the RS; and the bigger the time interval between adjacent random access points of the RAMS is, the greater the play delay between the clients is. The technical solution of the present invention can play the video for the client with relative large lag at relative greater multiple of the speed and play for the preset time length to catch up with the multicast media stream played by the multicast server at the current time as soon as possible so as to synchronize the video play pictures of different clients.

Figure 3:
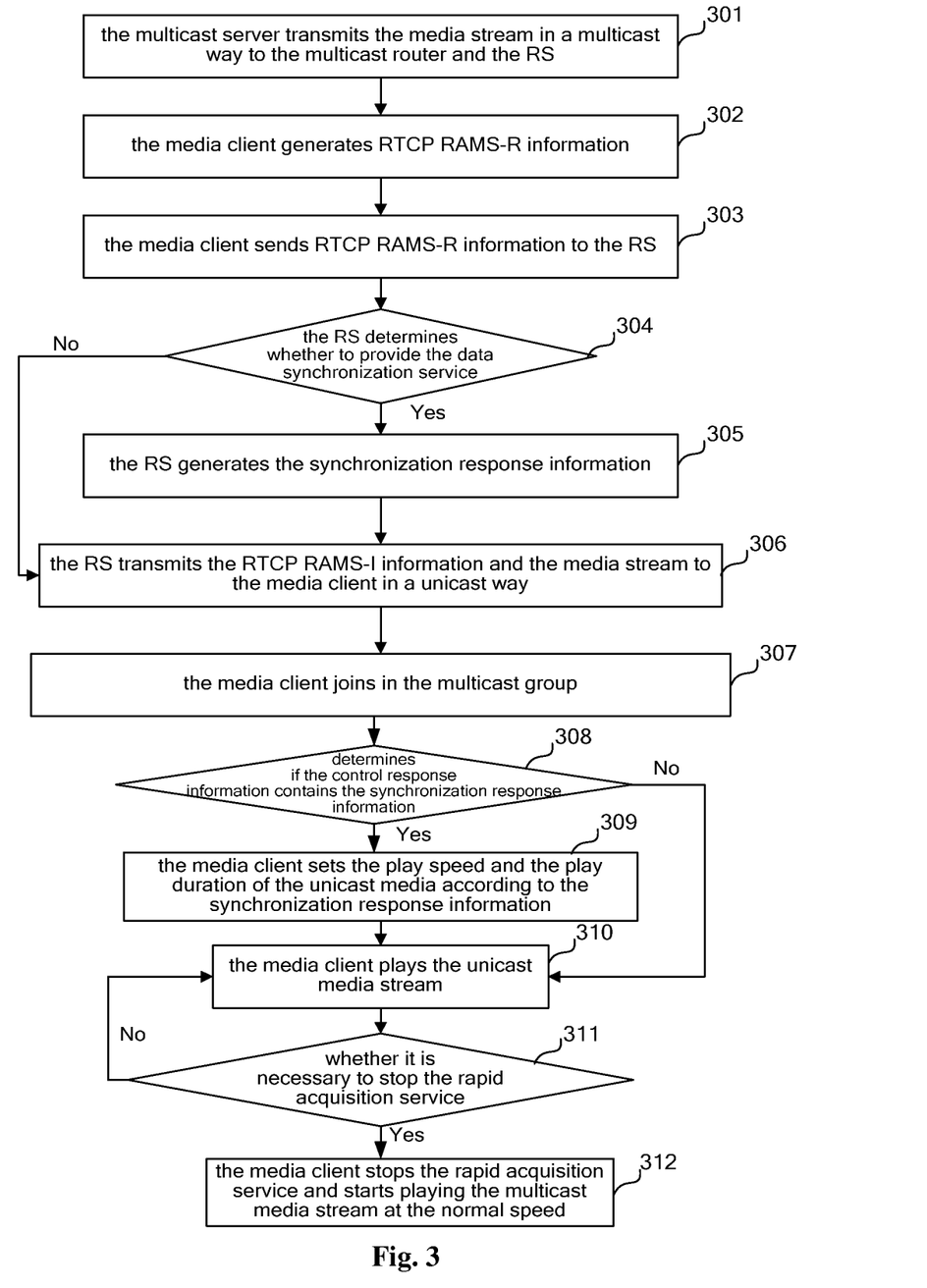
FIG. 3 shows a flowchart of a RAMS method in another embodiment of the present invention.

FIG. 3 shows a flowchart of a RAMS method in another embodiment of the present invention. In this embodiment, as a demonstration, the unicast server is a RS. As shown in the FIG. 3, the method of the embodiment comprises the following steps.

Step 301, the multicast server transmits the media stream in a multicast way to the multicast router and the RS; and the RS stores the received multicast media stream and the multicast acquisition information (Multicast Reference Information, MRI), wherein the Synchronization Source Identifier (SSRC) of the multicast stream media serves as the index of the stored information;

Step 302, in order to receive the multicast media stream, the media client starts the multicast rapid acquisition service to generate multicast rapid acquisition control request (RTCP RAMS-Request, RTCP RAMS-R) message, wherein besides the original information, such as the media pack serial number, the client buffer region size and the like included in the RTCP RAMS-R information in the related art, the RTCP RAMS-R message further contains the synchronization request information generated by the client synchronization module; and the format of the synchronization request information follows the format definition of Type, Length, Value (TLV) ruled by the IETF; and an example is as follows:

```
 0                   1                   2                   3
 0 1 2 3 4 5 6 7 8 9 0 1 2 3 4 5 6 7 8 9 0 1 2 3 4 5 6 7 8 9 0 1
Type = 1|   Length = 4   |Value = 1|
```

In the example, the synchronization request information comprises three fields and four bytes; and the value and definition of each field are as follows:

type: value of the type of synchronization request information is 1, and the field takes up one byte;

length: a complete length of the synchronization request information is 4; the unit is byte; and the field takes up two bytes; and value: the value can serve as the data synchronization flag for indicating whether the media client needs the data synchronization; different values of the value indicate whether the data synchronization is needed; in the example, the value is 1 if the data synchronization is needed; otherwise, the value is 0; and the field takes up one byte.

Step 303, the media client sends the RTCP RAMS-R message to the RS.

Step 304, the RS analyzes the RTCP RAMS-R message, determines whether to provide the data synchronization service according to the value of the synchronization request information, i.e., the value of the data synchronization flag, and the fact whether the RS has the data synchronization capability; and if yes, turn to the Step 305, otherwise, turn to the Step 306; and as a demonstration, when the value of the synchronization request information is 1 and the RS has the data synchronization capability, the Step 305 is performed, otherwise, the Step 306 is performed.

Step 305, the RS generates the synchronization response information according to the time difference between the media play time of the stored random access point and the current time; preferably, the RS generates the synchronization response information based on the time difference between the media play time of the stored latest random access point and the current time; the latest random access point is the random access point closest to the current time; and as a demonstration, the server side synchronization module generates the synchronization response information according to the time difference between the media play time of the stored latest random access point and the current time; and the generation method is illustrated by an example as follows.

For example:

the time difference between the media play time of the latest random access point and the current time is T sec, and the time of the latest access point is generally less than the current time, so that T is equal to the current time minus the media play time of the latest random access point;

the play speed of the unicast media stream is S multiples of the normal play speed; and S is greater than or equal to 1; and the play duration of the unicast media stream is L;

as a result $$L = \begin{cases} T/(S-1), & S > 1 \\ 0, & S = 1 \end{cases}$$

where, the value of S can be determined by the unicast server according to the preset first corresponding relationship; and the first corresponding relationship is the corresponding relationship between the time difference and the play speed of the unicast media stream, wherein the time difference is between the media play time of the currently stored latest random access point and the current time.

In the example, the unit of T and L are the same, but not limited to sec.

As a demonstration, the value of S increases along with the increase of the value of T.

As a demonstration but not as a limitation, the first corresponding relationship can be expressed as follows: when the T is greater than the preset threshold T1, the multiple of the play speed is the preset S1; when the T is greater than the preset threshold T2, T2 is greater than T1; and the multiple of the play speed is the preset S2, S2 is greater than S1.

The first corresponding relationship can be expressed in a plurality of ways according to strategies of different providers.

An illustration is made by an example as follows: when the media client 1 joins in at the 4th sec and the play time of the current latest random access point is the 0 sec, the time difference T between the current time and the play time of the current latest access point is 4 sec, that is, the vide content played by the client 1 is lagged for 4 sec, and thus the S between the current time and the client 1 may be 2, that is to say, the client 1 rapidly plays the received random access point at double speed. The double speed is carried into the formula L=4/(2−1)=4, so that the play duration is 4 sec, and the client 1 will catch up with the play content of the multicast server at the 8th sec. When the media client 2 joins at the 8th sec and when the play time of the current latest random access point, that is, closest to the current time is at 0 sec, the time difference T between the current time and the current latest random access point is 8 sec. The video content played by the client 2 is lagged for 8 sec, and the S of the client 2 may be 4; that is to say, the client 2 rapidly plays the received latest random access point at quadruple speed. The quadruple speed is carried into the formula L=8/(4−1)=8/3 sec, so that the play duration is 8/3 sec and the client 2 will catch up with the play content of the multicast server at the (8+8/3)th sec. The play speed and the play duration are set in such a way that the media client 1 and the media client 2 can solve the problem of video play picture delay as soon as possible and catch up with the video content played currently by the multicast server so as to realize the synchronization of the video play pictures at different media clients.

As a demonstration, the RS generates the sending module via signalling, and writes the S and T as the synchronization response information into the multicast rapid acquisition control response signalling (RTCP RAMS-Information, RTCP RAMS-I). Except for the synchronization response information, other information, such as the multicast join information in the control response signalling, is the same as the control response signalling of the RAMS method in the related art. The format of the synchronization response information follows the format definition of Type, Length, Value (TLV). The information of the multiple of the normal play speed of the unicast media stream is illustrated by an example as follows:

```
 0                   1                   2                   3
 0 1 2 3 4 5 6 7 8 9 0 1 2 3 4 5 6 7 8 9 0 1 2 3 4 5 6 7 8 9 0 1
Type = 1|   Length = 4   |Value = S|
```

In the example, the synchronization response information comprises three fields and four bytes; and the value and definition of each field are as follows:

type: the type value of the multiple of the normal play speed of the unicast media stream is 1, and the field takes up one byte;

length: the length of the multiple information of the play speed of the unicast media stream relative to the normal play speed is 4; the unit is byte; and the field takes up two bytes; and value: S should be greater than or equal to 1; and the field takes up one byte.

The play duration information of the unicast media stream is illustrated by an example as follows:

```
 0                   1                   2                   3
 0 1 2 3 4 5 6 7 8 9 0 1 2 3 4 5 6 7 8 9 0 1 2 3 4 5 6 7 8 9 0 1
|Type = 2|  Length = 4  |Value = L|
```

In the example, the play duration information of the unicast media stream comprises three fields and four bytes; and the value and definition of each field are as follows:

type: the play duration type value of the unicast media stream is 2, and the field takes up one byte;

length: the length of the play duration information of the unicast media stream is 4; the unit is byte; and the field takes up two bytes; and value: L; the unit is sec; and the field takes up one byte.

Step 306, the RS transmits the RTCP RAMS-I information and the media stream to the media client in a unicast way; the media stream is the media stream stored by the RS and sent by the multicast server in a multicast way; and the media stream that is transmitted in a unicast way from the RS to the media client contains the media stream information of the random access point, and preferably contains the media stream information of the latest random access point, so that the media client can generate the video picture according to the random access point.

Step 307, the media client joins in the multicast group according to the multicast RI in the RTCP RAMS-I and starts receiving the multicast media stream.

Step 308, the media client determines whether the RTCP RAMS-I information contains the synchronization response information; and if yes, turn into the Step 309; otherwise, turn into the Step 310.

Step 309, the client synchronization module of the media client sets the multiple of the play speed of the unicast media stream relative to the preset normal play speed as S and the play duration of the speed as L according to the synchronization response information, wherein S is greater than 1.

Step 310, the media client plays the unicast media stream at the above set play speed.

Step 311, the media client determines whether it is necessary to stop the multicast RTP rapid acquisition service; and if yes, perform the Step 312; otherwise, perform the Step 310 to carry on the play of the unicast media stream.

Preferably, determining whether it is necessary to stop the multicast RTP rapid acquisition service is based on the fact that: whether the time length for playing the unicast media stream at the play speed by the media client reaches to the play duration in the synchronization information, that is to say, determining whether the play already lasts for the play duration L sec set in the Step 309; and if yes, performs the Step 312; otherwise, performs the Step 310.

Step 312, the media client sends the multicast rapid acquisition termination message (RTCP RAMS Termination, RTCP RAMS-T) to the RS; the RS ends the unicast of the rapidly sent media stream; the media client sends the RTCP end (RTCP BYE) message to the RS to end the RTP/RTCP communication between the media client and the RS; the media client and the RS both end the rapid acquisition service; and the media client ends the playing of the unicast media stream and starts to play the multicast media stream at the normal speed.

In the embodiment of the present invention, each control signalling is as same as the control signalling of the RAMS method in the related art and contains the content necessary for the multicast rapid acquisition, such as the multicast acquisition information contained in the control response signalling; the control request signalling contains media pack serial number, client SSRC, client buffer region size and the like. The detail will not be described here in redundancy.

In the above embodiments of the invention, there is no specific requirement on the transmission method of the medium stream and the control signalling between the device and the module, so that conventional transmission methods can be used for transmission.

In the RAMS solution, the media stream and the control signalling are carried by the RTP/RTCP protocol. Therefore, in the illustration of the processing flow of the technical solution of the present invention, the transferred multicast and unicast media streams are carried by the RTP protocol; and the control signalling containing the synchronization information in the solution of the present invention is transferred as the expanded content of the RTCP pack between the RS and the media client.

Figure 4:
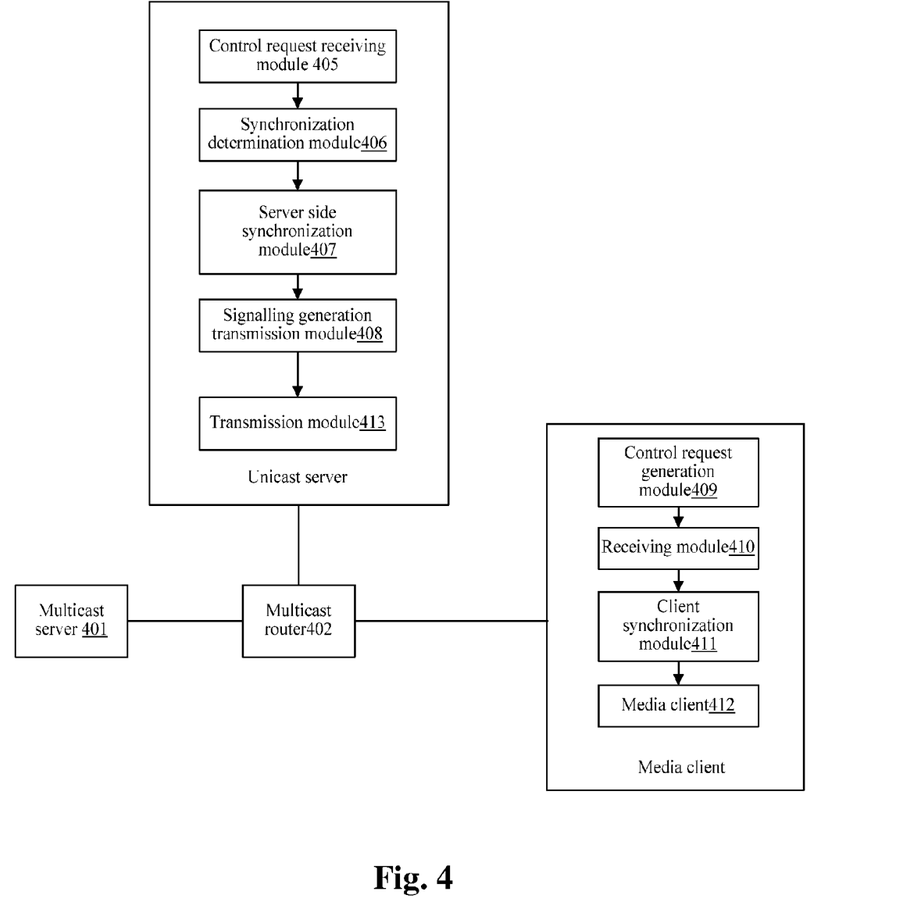
FIG. 4 shows a structural block diagram of a RAMS system according to an embodiment of the present invention.

FIG. 4 shows a structural block diagram of the multicast RTP session rapid acquisition system, that is the RAMS system, according to an embodiment of the present invention. As shown in the FIG. 4, the RAMS system of the embodiment comprises four parts as follows: a multicast server 401, a multicast router 402, a unicast server 403 and a media client 404.

In the system of the embodiment, the unicast server 403 comprises a control request receiving module 405 adapted for receiving multicast rapid acquisition control request signalling sent by the media client, wherein the control request signalling contains synchronization request information; a synchronization determination module 406 adapted for determining data synchronization of the media client according to the synchronization request information in the control request signalling; a server side synchronization module 407 adapted for determining synchronization response information for the data synchronization of the media client according to the time difference between play time of a stored random access point and the current time, wherein the synchronization response information contains play speed information and play duration of unicast media stream; a signalling generation module 408 adapted for generating multicast rapid acquisition control response signalling, wherein the control response signalling contains synchronization response information and multicast acquisition information; and a transmission unit 413 adapted for transmitting the control response signalling and stored media stream to the media client in a unicast way.

In the system of the embodiment, the media client comprises a control request generation module 409 adapted for generating the multicast rapid acquisition control request signalling, wherein the control request signalling contains synchronization information; a receiving module 410 adapted for receiving the multicast rapid acquisition control response signalling unicast by the unicast server and unicast media stream; a client synchronization module 411 adapted for setting the play speed and the play duration for the play of the unicast media stream according to the synchronization response information in the control response signalling received by the receiving module; and a playing module 412 adapted for playing the received unicast media stream according to the play speed and the play duration of the unicast media stream.

The interactive ways among the four devices of the RAMS system of the embodiment are the same as those of the RAMS system in the related art. The difference therebetween is only that synchronization information is added in the control signalling between the media client and the unicast server to realize the data synchronization between the media clients and to solve the problem of asynchronization of the video play picture between different media clients, in particular, the lagged video play picture of some media clients.

Figure 5:
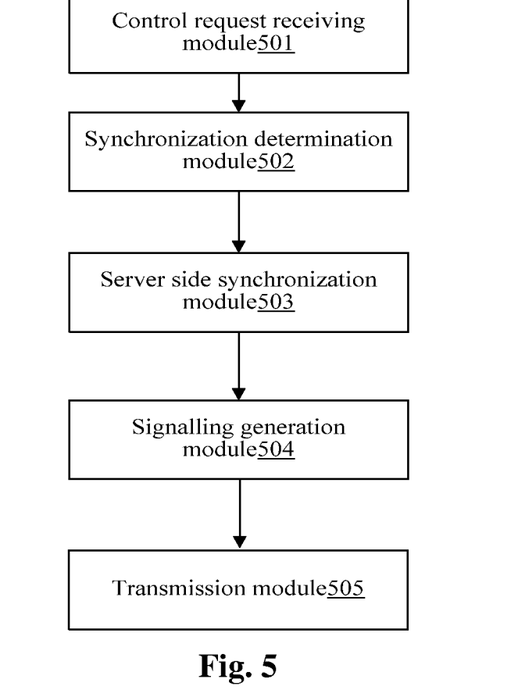
FIG. 5 shows a structural block diagram of a unicast server according to an embodiment of the present invention.

FIG. 5 shows a structural block diagram of a unicast server according to an embodiment of the present invention. As shown in the FIG. 5, the unicast server comprises a control request receiving module 501 adapted for receiving multicast rapid acquisition control request signalling sent by a media client, wherein the control request signalling contains synchronization request information; a synchronization determination module 502 adapted for determining data synchronization of the media client according to the synchronization request information in the control request signalling; a server side synchronization module 503 adapted for determining synchronization response information for the data synchronization of the media client according to the time difference between play time of a stored random access point and the current time, wherein the synchronization response information contains play speed information and play duration of unicast media stream; a signalling generation module 504 adapted for generating multicast rapid acquisition control response signalling, wherein the control response signalling contains synchronization response information and multicast acquisition information; and a transmission unit 505 adapted for transmitting the control response signalling and stored media stream to the media client in a unicast way so as to bring convenience for the media client to set the play speed and play duration of the unicast media stream, wherein the stored media stream contains the random access point multicast by the multicast server.

Preferably, in the unicast server of the embodiment of the present invention, the play speed of the unicast media stream is multiple of the preset normal play speed; and the multiple is greater than or equal to 1.

Preferably, in the unicast server of the embodiment of the present invention, the server side synchronization module comprises: a play speed determination module adapted for determining the play speed of the unicast media stream according to the preset first corresponding relationship, wherein the first corresponding relationship is the corresponding relationship between the time difference that is between the media play time of the stored latest random access point and the current time and the play speed of the unicast media stream; and a play duration determination module adapted for determining the play duration L of the unicast media stream through the following formula:

$$L = \begin{cases} T/(S-1), & S > 1 \\ 0, & S = 1 \end{cases}$$

where, S is the multiple of the play speed of the unicast media stream relative to the normal play speed; the multiple is greater than or equal to 1; and T is the time difference between the media play time of the currently stored latest random access point and the current time.

Figure 6:
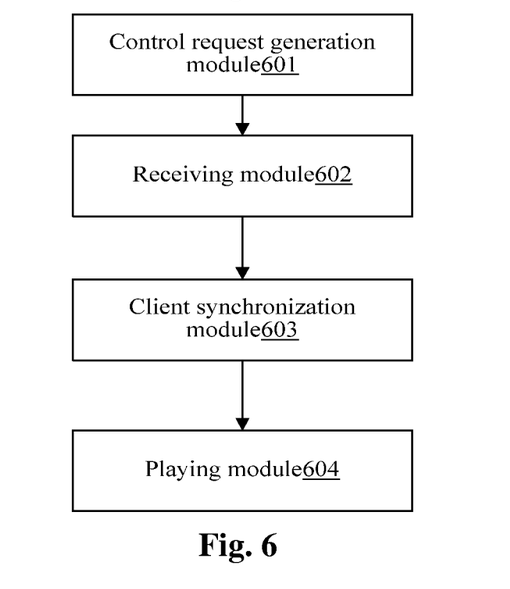
FIG. 6 shows a structural block diagram of a media client according to an embodiment of the present invention.

FIG. 6 shows a structural block diagram of a media client according to an embodiment of the present invention. As shown in the FIG. 6, the media client of the embodiment comprises: a control request generation module 601 adapted for generating the multicast rapid acquisition control request signalling, wherein the control request signalling contains synchronization information; a receiving module 602 adapted for receiving the multicast rapid acquisition control response signalling unicast by the unicast server and unicast media stream, wherein the control response signalling contains multicast acquisition information and synchronization response information for the data synchronization of the media client; the synchronization response information contains play speed information and play duration of the unicast media stream; and the unicast media stream contains the random access point stored by the unicast server; a client synchronization module 603 adapted for setting the play speed and the play duration for the play of the unicast media stream according to the synchronization response information in the control response signalling received by the receiving module; and a playing module 604 adapted for playing the received unicast media stream according to the play speed and the play duration of the unicast media stream.

Preferably, when the play duration of the unicast media stream played by the playing module is the play duration of the unicast media stream in the synchronization response information, that is the above set duration, the media client stops the rapid acquisition service, stops playing the unicast media stream and starts to play the multicast media stream at the preset normal speed.

The rapid acquisition service comprises: receiving and playing the unicast media stream sent by the unicast server, and performing the control signalling communication between the unicast servers.

The implementation of the present invention can be achieved by adding corresponding modules for realizing the synchronization logic functions directly to the RS and media client of the RAMS system in the related art, or the media data synchronization function of the present invention can be realized by using independent physical devices.

The above is only the preferred embodiment of the present invention. It should be noted that for those skilled in the art, under the premise of not departing from the principle of the present invention, several improvements and modifications can be made to the present invention, and such improvements and modifications should be considered as within the protection scope of the present invention.

What is claimed is:

1. A method for rapid acquisition of multicast realtime transport protocol sessions, comprising the steps of:
   receiving, by a unicast server, a multicast rapid acquisition control request signalling transmitted by a media client, wherein the control request signalling comprises synchronization request information;
   determining, by the unicast server, that the media client performs data synchronization according to the synchronization request information in the control request signalling;
   determining, by the unicast server, synchronization response information for the media client to perform a data synchronization according to a time difference between stored play time of a random access point and a current time, wherein the synchronization response information comprises: play speed information of a unicast media stream and play duration of the unicast media stream;
   generating a multicast rapid acquisition control response signalling by the unicast server, wherein the control response signalling comprises: the synchronization response information and multicast acquisition information; and
   transmitting, by the unicast server, the control response signalling and a stored media stream to the media client in a unicast way so that the media client sets the play speed and the play duration for playing the unicast media stream; and the stored media stream comprises random access point transmitted in a multicast way by a multicast server.

2. The method according to claim 1, wherein
the synchronization request information comprises: a data synchronization flag; and
the step of determining by the unicast server that the media client performs the data synchronization according to the synchronization request information in the control request signalling comprises: determining, by the unicast server, that the media client performs the data synchronization according to a value of the data synchronization flag.

3. The method according to claim 1, wherein the play speed of the unicast media stream is a multiple of a preset normal play speed; and the multiple is greater than or equal to 1.

4. The method according to claim 3, after generating the multicast rapid acquisition control response signalling by the unicast server, further comprising:
the media client receiving the control response signalling, joining in a multicast group according to the multicast acquisition information in the control response signalling, receiving the media stream of the multicast group, and setting the play speed of the unicast media stream and the play duration of the unicast media stream according to the synchronization response information; and
the media client playing the received unicast media stream according to the play speed of the unicast media stream and the play duration of the unicast media stream.

5. The method according to claim 4, after the media client playing the received unicast media stream according to the play speed of the unicast media stream and the play duration of the unicast media stream, further comprising:
when the duration of playing the unicast media stream by the media client is the play duration of the unicast media stream, playing the multicast media stream at a normal speed by the media client.

6. The method according to claim 1, wherein the step of determining by the unicast server the synchronization response information for the media client to perform the data synchronization according to the time difference between the stored play time of the random access point and the current time comprises: determining by the unicast server the synchronization response information for the media client to perform the data synchronization according to the time difference between the stored play time of a latest random access point and the current time.

7. The method according to claim 6, wherein
the unicast server determines the play speed of the unicast media stream according to a preset first corresponding relation; and the first corresponding relation is: the corresponding relation between the time difference, wherein the time difference is between the stored media play time of the latest random access point and the current time, and the play speed of the unicast media stream.

8. The method according to claim 7, wherein the play duration L of the unicast media stream is determined by the following formula:

$$L = \begin{cases} T/(S-1), & S > 1 \\ 0, & S = 1 \end{cases}$$

where S represents the multiple of the play speed of the unicast media stream relative to the normal play speed; the multiple is greater than or equal to 1; and T represents the time difference between the stored media play time of the latest random access point and the current time.

9. A unicast server, comprising:
a control request receiving module, configured to receive a multicast rapid acquisition control request signalling transmitted by a media client, wherein the control request signalling comprises synchronization request information;
a synchronization determination module, configured to determine that the media client performs a data synchronization according to the synchronization request information in the control request signalling;
a server side synchronization module, configured to determine the synchronization response information for the media client to perform the data synchronization according to a time difference between a stored media play time of a random access point and a current time, wherein the synchronization response information comprises: play speed information of a unicast media stream and play duration of the unicast media stream;
a signalling generation module, configured to generate a multicast rapid acquisition control response signalling, wherein the control response signalling comprises: the synchronization response information and multicast acquisition information; and
a transmission module, configured to transmit the control response signalling and a stored media stream to the media client in a unicast way so that the media client sets the play speed and the play duration for playing the unicast media stream; and the stored media stream comprises a random access point transmitted in a multicast way by a multicast server.

10. The unicast server according to claim 9, wherein the play speed of the unicast media stream is a multiple of the preset normal play speed; and the multiple is greater than or equal to 1.

11. The unicast server according to claim 9, wherein the server side synchronization module comprises:
a play speed determination module, configured to determine the play speed of the unicast media stream according to a preset first corresponding relation; and the first corresponding relation is: the corresponding relation between the time difference, wherein the time difference between the stored media play time of the latest random access point and the current time, and the play speed of the unicast media stream; and
a play duration determination module, configured to determine the play duration L of the unicast media stream by the following formula:

$$L = \begin{cases} T/(S-1), & S > 1 \\ 0, & S = 1 \end{cases}$$

where S represents the multiple of the play speed of the unicast media stream relative to the normal play speed; the multiple is greater than or equal to 1; and T represents the time difference between the stored media play time of a latest random access point and the current time.

12. A media client, comprising:
a control request generation module, configured to generate a multicast rapid acquisition control request signalling, wherein the control request signalling comprises synchronization request information;

a receiving module, configured to receive a unicast media stream and a multicast rapid acquisition control response signalling transmitted by a unicast server in the unicast way, wherein the control response signalling comprises: multicast acquisition information and synchronization response information for the media client to perform the data synchronization; the synchronization response information comprises: play speed of the unicast media stream and play duration of the unicast media stream; and the unicast media stream comprises a random access point stored by the unicast server;

a client synchronization module, configured to set the play speed of the unicast media stream and the play duration of the unicast media stream according to the synchronization response information in the control response signalling received by the receiving module; and a playing module configured to play the received unicast media stream according to the play speed of the unicast media stream and the play duration of the unicast media stream.

13. A system for rapid acquisition of multicast realtime transport protocol sessions of stream media, comprising: a multicast server, a multicast router, a unicast server and a media client, wherein, the unicast server comprises:

a control request receiving module, configured to receive a multicast rapid acquisition control request signalling transmitted by the media client, wherein the control request signalling comprises synchronization request information;

a synchronization determination module, configured to determine that the media client performs a data synchronization according to the synchronization request information in the control request signalling;

a server side synchronization module, configured to determine synchronization response information for the media client to perform the data synchronization according to a time difference between stored media play time of a random access point and a current time, wherein the synchronization response information comprises: play speed information of a unicast media stream and play duration of the unicast media stream;

a signalling generation module, configured to generate a multicast rapid acquisition control response signalling, wherein the control response signalling comprises: the synchronization response information and multicast acquisition information; and a transmission module, configured to transmit the control response signalling and the stored media stream to the media client in a unicast way so that the media client sets the play speed and the play duration for playing the unicast media stream; and the stored media stream comprises a random access point transmitted in a multicast way by a multicast server; and the media client comprises:

a control request generation module, configured to generate the multicast rapid acquisition control request signalling, wherein the control request signalling comprises the synchronization request information;

a receiving module, configured to receive the unicast media stream and the multicast rapid acquisition control response signalling transmitted by the unicast server in the unicast way and;

a client synchronization module, configured to set the play speed of the unicast media stream and the play duration of the unicast media stream according to the synchronization response information in the control response signalling; and a playing module configured to play the received unicast media stream according to the play speed of the unicast media stream and the play duration of the unicast media stream.

14. The method according to claim 2, wherein the step of determining by the unicast server the synchronization response information for the media client to perform the data synchronization according to the time difference between the stored play time of the random access point and the current time comprises: determining by the unicast server the synchronization response information for the media client to perform the data synchronization according to the time difference between the stored play time of a latest random access point and the current time.

15. The method according to claim 14, wherein the unicast server determines the play speed of the unicast media stream according to a preset first corresponding relation; and the first corresponding relation is: the corresponding relation between the time difference, wherein the time difference is between the stored media play time of the latest random access point and the current time, and the play speed of the unicast media stream.

16. The method according to claim 15, wherein the play duration L of the unicast media stream is determined by the following formula:

$$L = \begin{cases} T/(S-1), & S > 1 \\ 0, & S = 1 \end{cases}$$

where S represents the multiple of the play speed of the unicast media stream relative to the normal play speed; the multiple is greater than or equal to 1; and T represents the time difference between the stored media play time of the latest random access point and the current time.

17. The method according to claim 3, wherein the step of determining by the unicast server the synchronization response information for the media client to perform the data synchronization according to the time difference between the stored play time of the random access point and the current time comprises: determining by the unicast server the synchronization response information for the media client to perform the data synchronization according to the time difference between the stored play time of a latest random access point and the current time.

18. The method according to claim 17, wherein the unicast server determines the play speed of the unicast media stream according to a preset first corresponding relation; and the first corresponding relation is: the corresponding relation between the time difference, wherein the time difference is between the stored media play time of the latest random access point and the current time, and the play speed of the unicast media stream.

19. The method according to claim 18, wherein the play duration L of the unicast media stream is determined by the following formula:

$$L = \begin{cases} T/(S-1), & S > 1 \\ 0, & S = 1 \end{cases}$$

where S represents the multiple of the play speed of the unicast media stream relative to the normal play speed; the multiple is greater than or equal to 1; and T represents the time difference between the stored media play time of the latest random access point and the current time.

20. The unicast server according to claim 10, wherein the server side synchronization module comprises:
a play speed determination module, configured to determine the play speed of the unicast media stream according to a preset first corresponding relation; and the first corresponding relation is: the corresponding relation between the time difference, wherein the time difference between the stored media play time of a latest random access point and the current time, and the play speed of the unicast media stream; and
a play duration determination module, configured to determine the play duration L of the unicast media stream by the following formula:

$$L = \begin{cases} T/(S-1), & S > 1 \\ 0, & S = 1 \end{cases}$$

where S represents the multiple of the play speed of the unicast media stream relative to the normal play speed; the multiple is greater than or equal to 1; and T represents the time difference between the stored media play time of the latest random access point and the current time.

* * * * *